(12) United States Patent
Nomura et al.

(10) Patent No.: US 6,547,030 B1
(45) Date of Patent: Apr. 15, 2003

(54) POSITIONING MECHANISM

(75) Inventors: Keiji Nomura, Nara (JP); Takehito Tomita, Kashiwara (JP); Akihisa Umetani, Nara (JP); Takeo Iino, Kashiwara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/868,697

(22) PCT Filed: Jun. 2, 2000

(86) PCT No.: PCT/JP00/03576

§ 371 (c)(1),
(2), (4) Date: Jun. 20, 2001

(87) PCT Pub. No.: WO01/38160

PCT Pub. Date: May 31, 2001

(30) Foreign Application Priority Data

Nov. 22, 1999 (JP) .......................................... 11-331314

(51) Int. Cl.⁷ .................................................. B62D 5/08
(52) U.S. Cl. ...................................... 180/441; 180/441
(58) Field of Search ................................ 180/441, 417, 180/422, 423, 421; 403/326, 329, 372; 464/140, 162

(56) References Cited

U.S. PATENT DOCUMENTS

| | | | | |
|---|---|---|---|---|
| 3,776,653 A | * | 12/1973 | Buzogany .................. 403/372 |
| 4,195,944 A | * | 4/1980 | Cross ........................ 403/326 |
| 4,286,894 A | * | 9/1981 | Rongley .................... 403/372 |
| 4,569,614 A | * | 2/1986 | Yamauchi .................. 403/352 |
| 4,730,687 A | * | 3/1988 | Chikuma et al. ........... 180/142 |
| 5,447,209 A | * | 9/1995 | Sasaki et al. ............... 180/132 |
| 5,791,433 A | * | 8/1998 | Murakami et al. .......... 180/417 |

FOREIGN PATENT DOCUMENTS

| | | | |
|---|---|---|---|
| JP | 08159323 A | 6/1996 | |
| JP | 10299786 A | * 11/1998 | ........... B62D/1/16 |

* cited by examiner

Primary Examiner—Lesley D. Morris
Assistant Examiner—Tony Winner
(74) Attorney, Agent, or Firm—Jordan and Hamburg LLP

(57) ABSTRACT

A positioning mechanism is provided for a moving member that moves linearly by the turning of a screw member driven by a stepping motor. A drive shaft driven to turn by the stepping motor is fitted, so that turning transmission is possible, into the screw member that screws into the moving member that is capable of moving linearly. A configuration prevents the moving member from turning together with the screw member when the screw member is turning. Origin positioning is performed, by using a stopper, by stopping the linear movement of moving member caused by driving the motor to turn in one direction. The moving member is positioned according to the turning steps of the motor in the other direction after the origin positioning. The drive shaft is fitted into the screw member via an elastic member interposed therebetween so that turning can be transmitted.

13 Claims, 14 Drawing Sheets

POSITIONING MECHANISM

TECHNICAL FIELD

This invention relates to a positioning mechanism for a member that is moved linearly by the turning of a screw member driven by a stepping motor, such as is used, for example, in the positioning of a variable-throttle valve spool in a hydraulic power steering device.

BACKGROUND ART

In a hydraulic power steering device, a variable-throttle valve is used which comprises a spool inserted in a housing so that it can move linearly along its axial direction, a screw member that screws into the spool, a stepping motor that drives and turns a drive shaft linked to that screw member so that turning of the drive shaft can be transmitted to the screw member, means for preventing a moving member from being turned together with the screw member when the screw member is turning, a stopper capable of stopping the movement of the spool in one direction due to the turning of the screw member, and a variable-throttle portion, a degree of opening of which varies according to the movement of the spool.

In order to accurately control the degree of opening of the throttle portion in response to the turning steps of the motor, origin positioning is performed by stopping the movement of the spool by a stopper, when the motor is turning in one direction. The spool is positioned in response to turning steps of the motor in the other direction after the origin positioning, and the degree of opening of the variable-throttle portion is determined by the positioning.

Conventionally, an insertion portion, whose cross-section perpendicular to the axis is non-circular, is formed on one of the drive shaft and the screw member, and this insertion portion is fitted into a receiving portion formed on the other of the screw member or the drive shaft so that turning can be transmitted from the drive shaft to the screw member.

There is a problem in the conventional constitution that an impact sound is produced when the origin positioning is made. To be more precise, in the conventional constitution, in order to absorb errors in the precision of the concentricity between the center axis of the drive shaft and the center axis of the screw member, the insertion portion is fitted into the receiving portion with an intervening gap in the radial direction. The number of pulses sent to the motor at the time of the origin positioning is set so that some pulses are sent to the motor even after the movement of the spool has been stopped by the stopper. Thus the spool is definitely moved to a position where it makes contact with the stopper. When that is done, due to the pulses sent to the motor after the spool movement has been stopped by the stopper, the motor tries to turn by the measure of the gap in the radial direction between the insertion portion and the receiving portion. As a result, the drive shaft and the screw member impact against each other and the impact sound is produced.

An object of the present invention is to provide a positioning mechanism capable of resolving the problem noted above.

DISCLOSURE OF THE INVENTION

The present invention is a positioning mechanism comprising a moving member capable of linear movement, a screw member that screws into the moving member, a drive shaft fitted into the screw member so that turning of the drive shaft can be transmitted to the screw member, a stepping motor for driving the drive shaft to turn, means for preventing the moving member from turning together with the screw member when the screw member is turning, and a stopper capable of stopping the linear movement of the moving member in one direction caused by the turning of the screw member, in which origin positioning is performed by stopping, by means of the stopper, the linear movement of the moving member caused by driving the motor to turn in one direction, the moving member is positioned according to turning steps of the motor in the other direction after the origin positioning, and the drive shaft is fitted into the screw member via an elastic member interposed therebetween so that turning of the drive shaft can be transmitted to the screw member.

Drive pulses are sent to the stepping motor when the origin positioning is made. The number of the drive pulses is set so that some pulses are sent to the motor even after the movement of the moving member has been stopped by the stopper. Thus the moving member moves to a position at which it makes contact with the stopper without fail. The motor tries to turn due to the pulses sent to the motor after the movement of the moving member has been stopped by the stopper. At this time, because the elastic member is interposed between the screw member and the drive shaft driven by the motor, it is possible to prevent the occurrence of an impact noise caused by the impact between the drive shaft and the screw member.

The fitting of the drive shaft into the screw member with the intervening elastic member may be done by press-fitting or interposing a gap in the radial direction. When the press-fitting is done, the error in concentricity precision between the center axis of the drive shaft and the center axis of the screw member can be absorbed by the elastic deformation of the elastic member. The elastic member may also be separate from the drive shaft and the screw member, or it may be integrated with either the drive shaft or the screw member, or with both. A spring, rubber, or resin, etc., can be used as the elastic member.

For fitting the drive shaft into the screw member, for example, an insertion portion, of which the cross-section perpendicular to the axis is non-circular, is formed on one of the drive shaft and the screw member, and this insertion portion is fitted, so that turning transmission is possible, via the elastic member, into a receiving portion formed on the other.

It is preferable that the moving member constitutes a spool that is inserted into a housing of a variable-throttle valve, that a variable-throttle portion, degree of opening of which varies according to the linear movement of the spool along its axial direction, is provided, and that the degree of opening of the variable-throttle portion is determined by the positioning of the spool according to turning steps of the motor in the other direction after the origin positioning.

Based on this constitution, the positioning mechanism of the present invention is applied to a variable-throttle valve, and therefore an impact noise can be prevented from occurring at the time of origin positioning for determining the degree of opening of the variable-throttle portion.

It is preferable that a hydraulic control valve, which has a plurality of throttle portions having degrees of opening of which vary according to steering resistance, is comprised, that the hydraulic pressure acting on a steering assistance power generating hydraulic actuator is changed according to changes in the degrees of opening of the throttle portions, that the plurality of throttle portions in the hydraulic control valve are divided into those belonging to a first group and those belonging to a second group that are arranged mutually parallel, that steering resistance required to close the throttle portions belonging to the second group is made larger than steering resistance required to close the throttle portions belonging to the first group, that the variable-throttle valve is connected in series with the throttle portions belonging to the second group so that the ratio of hydraulic fluid flow rate controlled by the throttle portions belonging to the first group to the hydraulic fluid flow rate controlled by the throttle portions belonging to the second group can be varied, and that pulses, whose number correspond to the vehicle driving conditions, are sent from the control device to the motor.

Based on this constitution, the ratio of the hydraulic fluid flow rate controlled by the throttle portions belonging to the first group relative to the hydraulic fluid flow rate controlled by the throttle portions belonging to the second group varies in response to the vehicle driving conditions. When the proportion of the hydraulic fluid flow rate controlled by the throttle portions belonging to the second group increases, the steering torque required to close the throttle portions against the steering resistance becomes greater, and therefore driving stability can be enhanced. When the proportion of the hydraulic fluid flow rate controlled by the throttle portions belonging to the first group increases, the steering torque required to close the throttle portions against the steering resistance becomes smaller, and therefore turning performance can be enhanced. These steering characteristics can be exerted by using a variable-throttle valve in which the positioning mechanism of the present invention is employed. Accordingly, the impact noise can be prevented from occurring at the time of origin positioning for determining the degree of opening of the variable-throttle portions, and the driver can be prevented from experiencing a sense of insecurity.

It is preferable that the drive shaft is constituted of a cylindrical main body and a metal insertion portion, whose cross-section perpendicular to its axis is non-circular and has a center hole, that the main body is press-fitted in the center hole of the insertion portion, that the screw member has a receiving portion that extends in a double forked shape in its axial direction, that the insertion portion is arranged between the two opposing inner surfaces of the receiving portion, and that a rubber coating material is provided as the elastic member so as to cover at least the areas on the outer surface of the insertion portion, which come to contact with the inner surfaces of the receiving portion. Thus, torque is received by the metal insertion portion, and impact noise is prevented from occurring by the rubber coating material.

Based on the present invention, in a mechanism for positioning a moving member driven linearly by a stepping motor through a screw member, the occurrence of impact noises can be prevented when origin positioning of the moving member is performed.

BRIEF DESCRIPTION OF THE DRAWINGS

FIG. 14(2) is a section at the P—P line in FIG. 14(1) and

FIG. 14(3) is a section at the Q—Q line in FIG. 14(1).

BEST MODE FOR CARRYING OUT THE INVENTION

Figure 1:
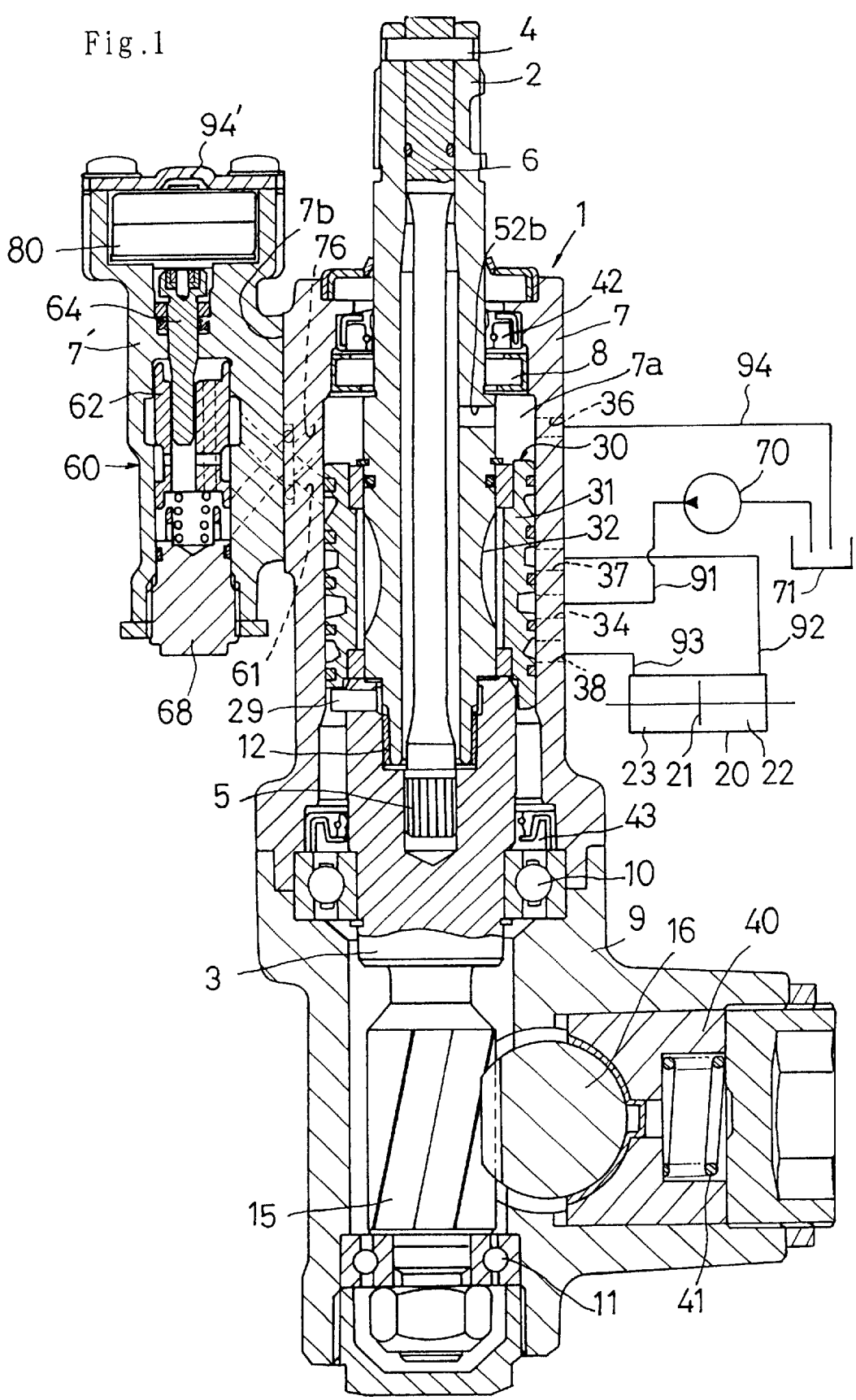
FIG. 1 is a vertical section of a hydraulic power steering device in an embodiment of the present invention.

A rack and pinion type hydraulic power steering device 1 in an embodiment of the present invention diagrammed in FIG. 1 comprises an input shaft 2 that is linked to the steering wheel (not shown) of the vehicle, and an output shaft 3 linked via a torsion bar 6 to the input shaft 2. The torsion bar 6 is linked to the input shaft 2 by a pin 4, and is linked to the output shaft 3 by serrations 5. The input shaft 2 is supported by a valve housing 7 through a bearing 8, and is supported by the output shaft 3 through a bushing 12. The output shaft 3 is supported by a rack housing 9 through bearings 10 and 11. A pinion 15 is formed on the output shaft 3, and the vehicle wheels (not shown) are linked to a rack 16 that engages with the pinion 15. Thus the turning of the input shaft 2 by steering operation is transmitted through the torsion bar 6 to the pinion 15. By the turning of the pinion 15, the rack 16 moves in the vehicle width direction, and the vehicle is steered by the movement of the rack 16. Between the input shaft 2 and the housing 7, and between the output shaft 3 and the housing 7, oil seals 42 and 43 are interposed. A support yoke 40 supporting the rack 16 is pressed against the rack 16 by the elastic force of a spring 41.

A hydraulic cylinder 20 is provided as a steering assistance power generating hydraulic actuator. This hydraulic cylinder 20 comprises a cylinder tube constituted of the rack housing 9 and a piston 21 formed integrally with the rack 16. A rotary type hydraulic control valve 30 is provided in order to supply hydraulic fluid, according to the steering resistance, to hydraulic chambers 22 and 23 partitioned by the piston 21.

The control valve 30 comprises a cylindrical first valve member 31 that is inserted in the valve housing 7 so that it can turn relative to the housing 7, and a second valve member 32 inserted concentrically to the first valve member 31 so that it can turn relative to the first valve member 31. The first valve member 31 is linked by a pin 29 to the output shaft 3 so as to turn together with the output shaft 3. The second valve member 32 is formed integrally with the outer circumference of the input shaft 2 so as to turn together with the input shaft 2. Accordingly, the first valve member 31 and the second valve member 32 turn relatively, elastically, and concentrically when the torsion bar 6 is twisted according to the steering resistance.

In the valve housing 7 are provided an inlet port 34 connected to a pump 70, a first port 37 connected to the one hydraulic chamber 22 in the hydraulic cylinder 20, a second port 38 connected to the other hydraulic chamber 23, a first outlet port 36 connected directly to a tank 71, and a second outlet port 61 connected to the tank 71 through a variable-throttle valve 60 described subsequently. The ports 34, 36, 37, 38, and 61 are interconnected through a flow path between the inner circumference of the first valve member 31 and the outer circumference of the second valve member 32.

Figure 3:
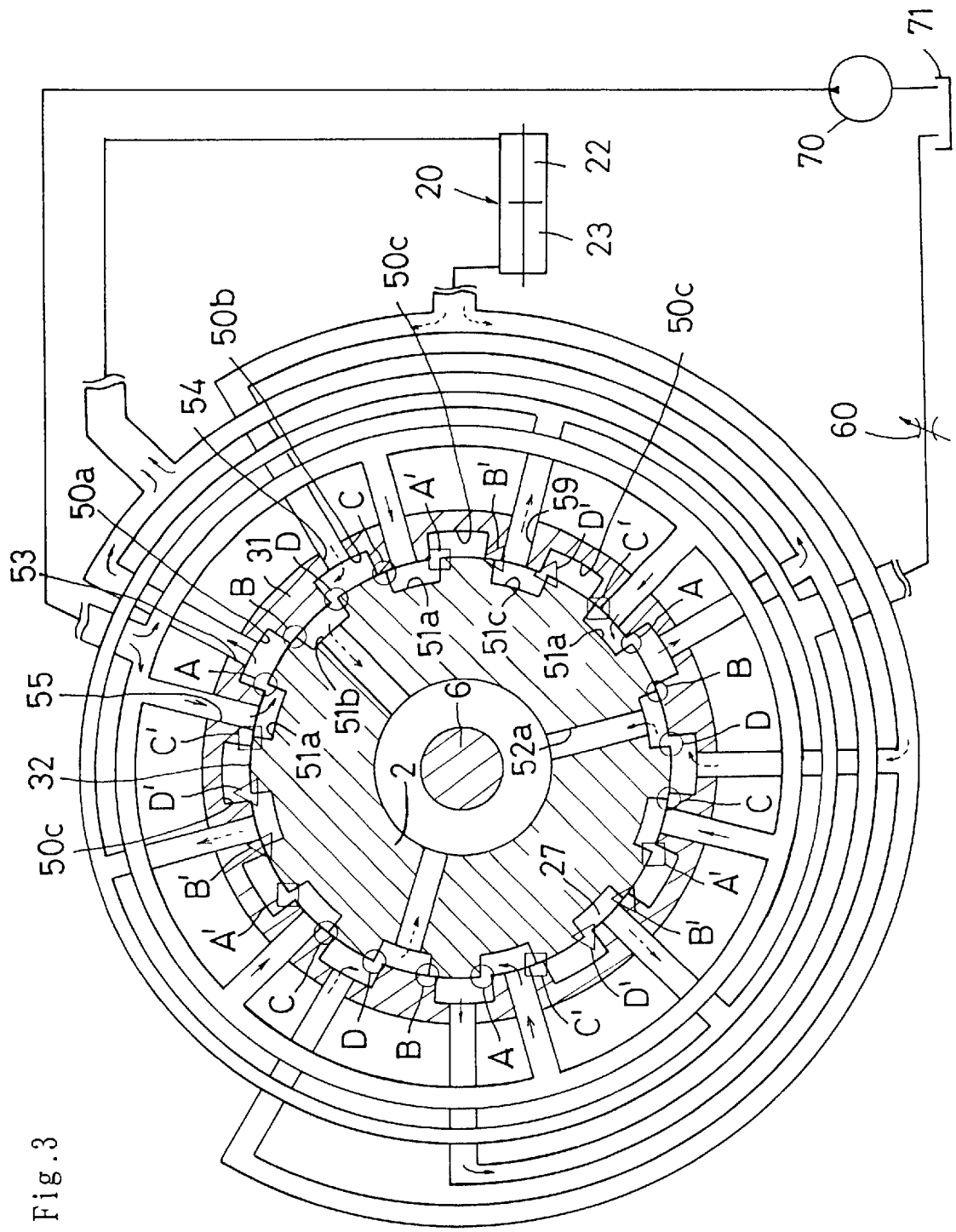
FIG. 3 is an explanatory diagram representing the lateral cross-sectional structure of the control valve in the hydraulic power steering device in the embodiment of the present invention.
Figure 4:
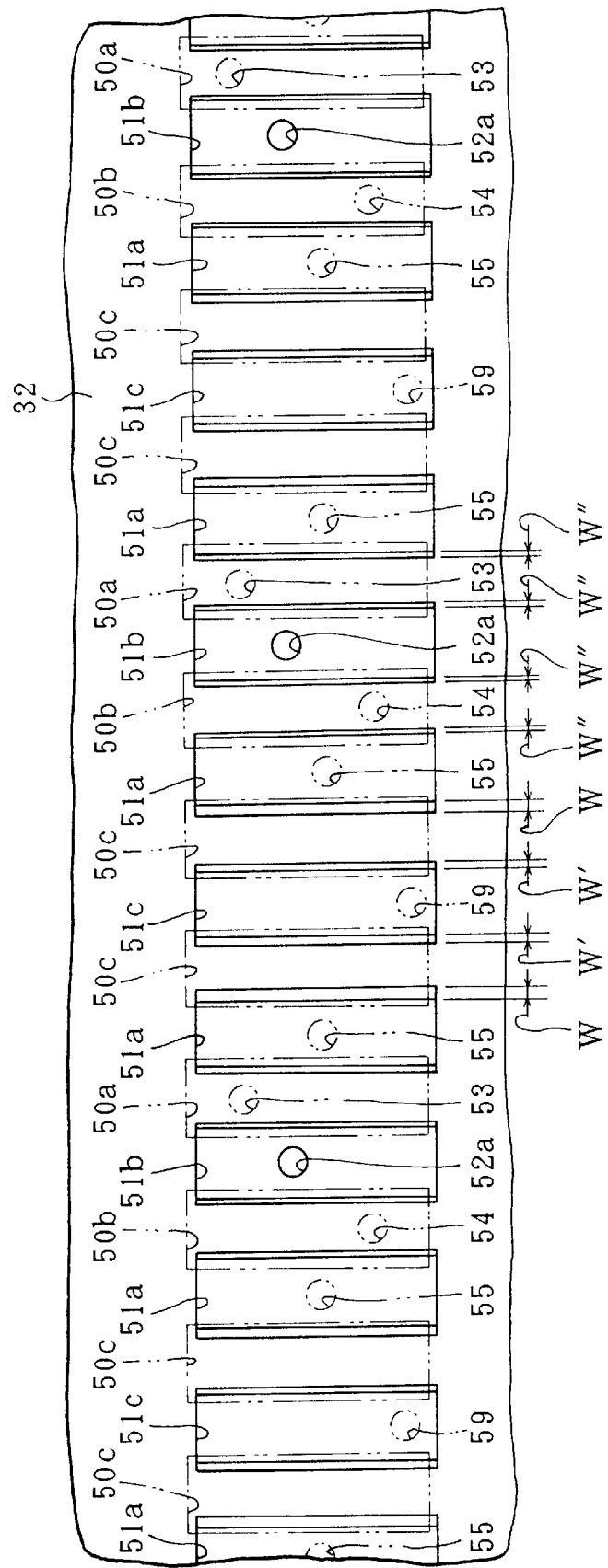
FIG. 4 is a developed view of the control valve in the hydraulic power steering device in the embodiment of the present invention.

To be more precise, as diagrammed in FIG. 3 and FIG. 4, on the inner circumference of the first valve member 31, twelve grooves 50a, 50b, and 50c arranged with equal intervals in the circumferential direction are formed. And, on the outer circumference of the second valve member 32, twelve grooves 51a, 51b, and 51c arranged with equal intervals in the circumferential direction are formed. FIG. 4 represents an expanded view of the second valve member 32 by solid lines, and indicates the grooves 50a, 50b, and 50c formed on the first valve member 31 by double-dashed lines. The grooves 51a, 51b, and 51c formed on the second valve member 32 are positioned between the grooves 50a, 50b, and 50c formed on the first valve member 31.

In the first valve member 31, three right steering grooves 50a three left steering grooves 50b, and six communicating grooves 50c are formed. The right steering grooves 50a are connected via the first port 37 and a flow path 53 formed in the first valve member 31 to the hydraulic chamber 22 for generating right steering assistance power in the hydraulic cylinder 20, with being arranged so as to be mutually separated by angles of 120° in the circumferential direction. The left steering grooves 50b are connected via the second port 38 and a flow path 54 formed in the first valve member 31 to the hydraulic chamber 23 for generating left steering assistance power in the hydraulic cylinder 20, with being arranged so as to be mutually separated by angles of 120° in the circumferential direction.

In the second valve member 32, six hydraulic fluid supply grooves 51a, three first hydraulic fluid discharge grooves 51b, and three second hydraulic fluid discharge grooves 51c are formed. The hydraulic fluid supply grooves 51a are connected through the inlet port 34 and a hydraulic fluid supply path 55 formed in the first valve member 31 to the pump 70, with being arranged so as to be mutually separated by angles of 60° in the circumferential direction. The first hydraulic fluid discharge grooves 51b are connected via a flow path 52a formed in the input shaft 2, a space between the input shaft 2 and the torsion bar 6, the first outlet port 36 and a flow path 52b formed in the input shaft 2 (cf. FIG. 1) to the tank 71, with being arranged so as to be mutually separated by angles of 120° in the circumferential direction. The second hydraulic fluid discharge grooves 51c are connected via the second outlet port 61 and a flow path 59 formed in the first valve member 31 to the variable-throttle valve 60, with being arranged so as to be mutually separated by angles of 120° in the circumferential direction.

Each of the first hydraulic fluid discharge grooves 51b is arranged between the right steering groove 50a and the left steering groove 50b, each of the second hydraulic fluid discharge grooves 51c is arranged between the communicating grooves 50c, and the hydraulic fluid supply grooves 51a are arranged between the right steering grooves 50a and the communicating grooves 50c and between the left steering grooves 50b and the communicating grooves 50c.

The edges extending along the axial direction of the grooves 50a 50b, and 50c formed on the first valve member 31 and the edges extending along the axial direction of the grooves 51a, 51b, and 51c formed on the second valve member 32 constitute throttle portions A, A', B, B', C, C', D, and D'. Thus the throttle portions A, A', B, B', C, C', D, and D' are arranged in the hydraulic fluid path 27 that connects the pump 70, tank 71, and hydraulic cylinder 20.

Figure 5:
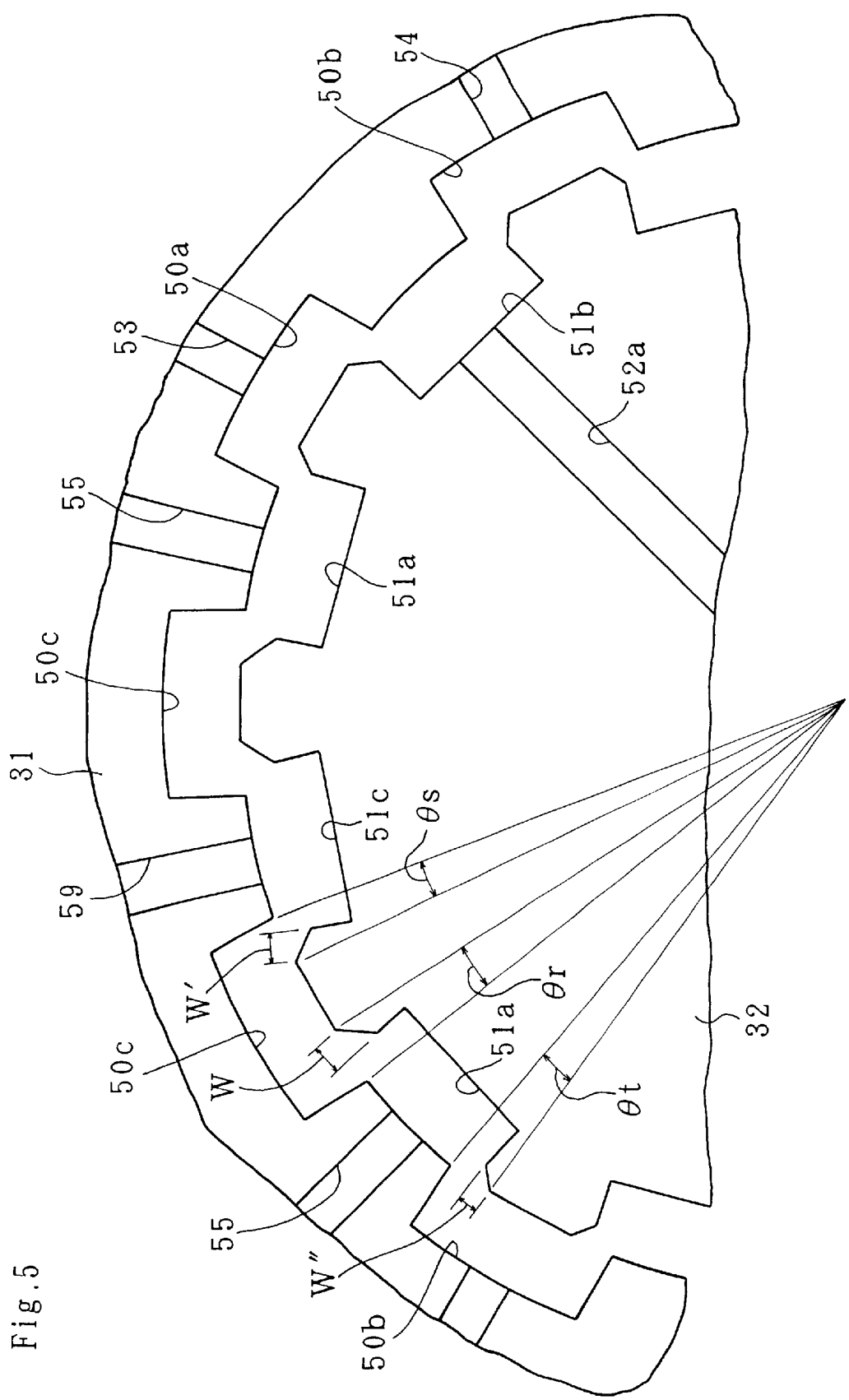
FIG. 5 is an enlarged partial view of the control valve in the hydraulic power steering device in the embodiment of the present invention.

As diagrammed in FIG. 5, the edges extending along the axial direction of the grooves 51a, 51b, and 51c formed on the second valve member 32 are formed as chamfered parts. The width of the chamfered parts of the edges (enclosed by □ in FIG. 3) extending along the axial direction of the hydraulic fluid supply grooves 51a in the throttle portions A' and C' between the hydraulic fluid grooves 51a and the communicating grooves 50c is represented by W, the width of the chamfered parts of the edges (enclosed by Δ in FIG. 3) extending along the axial direction of the second hydraulic fluid discharge grooves 51c in the throttle portions B' and D' between the communicating grooves 50c and the second hydraulic fluid discharge grooves 51c is represented by W', and the width of the chamfered parts of the edges (enclosed by ○ in FIG. 3) extending along the axial direction of the other grooves formed in the second valve member 32 is represented by W". In this case, as diagrammed in FIG. 4 and FIG. 5, the constitution is such that W>W'>W". When the relative turning angles (that is, the closing angles) of the two valve members 31 and 32 required to completely close the throttle portions A, A', B, B', C, C', D and D', from the condition where there is no steering resistance (condition diagrammed in FIG. 4 and FIG. 5) are compared with each other, the closing angle θr of the throttle portions A' and C' is larger than the closing angle θs of the throttle portions B' and D', and these two closing angles θr and θs are larger than the closing angle θt of the other throttle portions A, B, C, and D. Thus, the throttle portions between the first valve member 31 and the second valve member 32 are divided into two groups, namely a first group comprising the plurality of throttle portions A, B, C, and D, and a second group comprising the plurality of throttle portions A', B', C', and D' having larger closing angles than the throttle portions A, B, C, and D belonging to the first group. The steering resistance required to close the throttle portions A', B', C', and D' belonging to the second group is made larger than the steering resistance required to close the throttle portions A, B, C, and D belonging to the first group. The throttle portions belonging to the second group are of two types, namely the throttle portions B' and D', on the one hand, and the throttle portions A' and C' having a larger closing angle than the throttle portions B' and D', on the other.

The input shaft 2 and the output shaft 3 are turned relatively by the twisting of the torsion bar 6 resulting from steering resistance transmitted from the road surface through the vehicle wheels. Due to the relative turning, the first valve member 31 and the second valve member 32 also turn relatively, and thereby, the flow path areas, which is to say the degrees of opening, of the throttle portions A, B, C, D, A', B', C' and D' change. That is, the degrees of opening of the plurality of throttle portions A, B, C, D, A', B', C', and D' change in response to the steering resistance. In response to these changes in the degrees of opening, the hydraulic pressure acting on the hydraulic cylinder 20 is changed, and thereby steering assistance power is generated according to the steering resistance.

In a condition where steering operation is not being performed as diagrammed in FIG. 4, all of the throttle portions A, B, C, D, A', B', C', and D' between the two valve members 31 and 32 are opened, the inlet port 34 and the outlet ports 36 and 61 are connected to each other through the hydraulic fluid path 27, hydraulic fluid flowed into the control valve 30 from the pump 70 is circulated back to the tank 71, and no steering assistance power is generated. When the vehicle is steered to the right from this condition, the two valve members 31 and 32 turn relatively due to the steering resistance, and thus the degree of opening of the throttle portions A and A' becomes larger, the degree of opening of the throttle portions B and B' becomes smaller, the degree of opening of the throttle portions C and C' becomes smaller, and the degree of opening of the throttle portions D and D' becomes larger, as diagrammed in FIG. 3. Thus, by the flow of hydraulic fluid indicated by the arrows in the diagram, hydraulic fluid of a pressure according to the steering resistance is supplied to the hydraulic chamber 22 for generating right steering assistance power in the hydraulic cylinder 20. Also, hydraulic fluid circulates back to the tank 71 from the hydraulic chamber 23 for generating left steering assistance power. Accordingly, the assistance power for steering to the right acts on the rack 16 from the hydraulic cylinder 20.

In a case of left steering, the first valve member 31 and the second valve member 32 turn relatively in a direction opposite to that in a case of right steering, and therefore the degree of opening of the throttle portions A and A' becomes smaller, the degree of opening of the throttle portions B and B' becomes larger, the degree of opening of the throttle portions C and C' becomes larger, and the degree of opening of the throttle portions D and D' becomes smaller. Accordingly, the assistance power for steering to the left acts on the rack 16 from the hydraulic cylinder 20.

Figure 6:
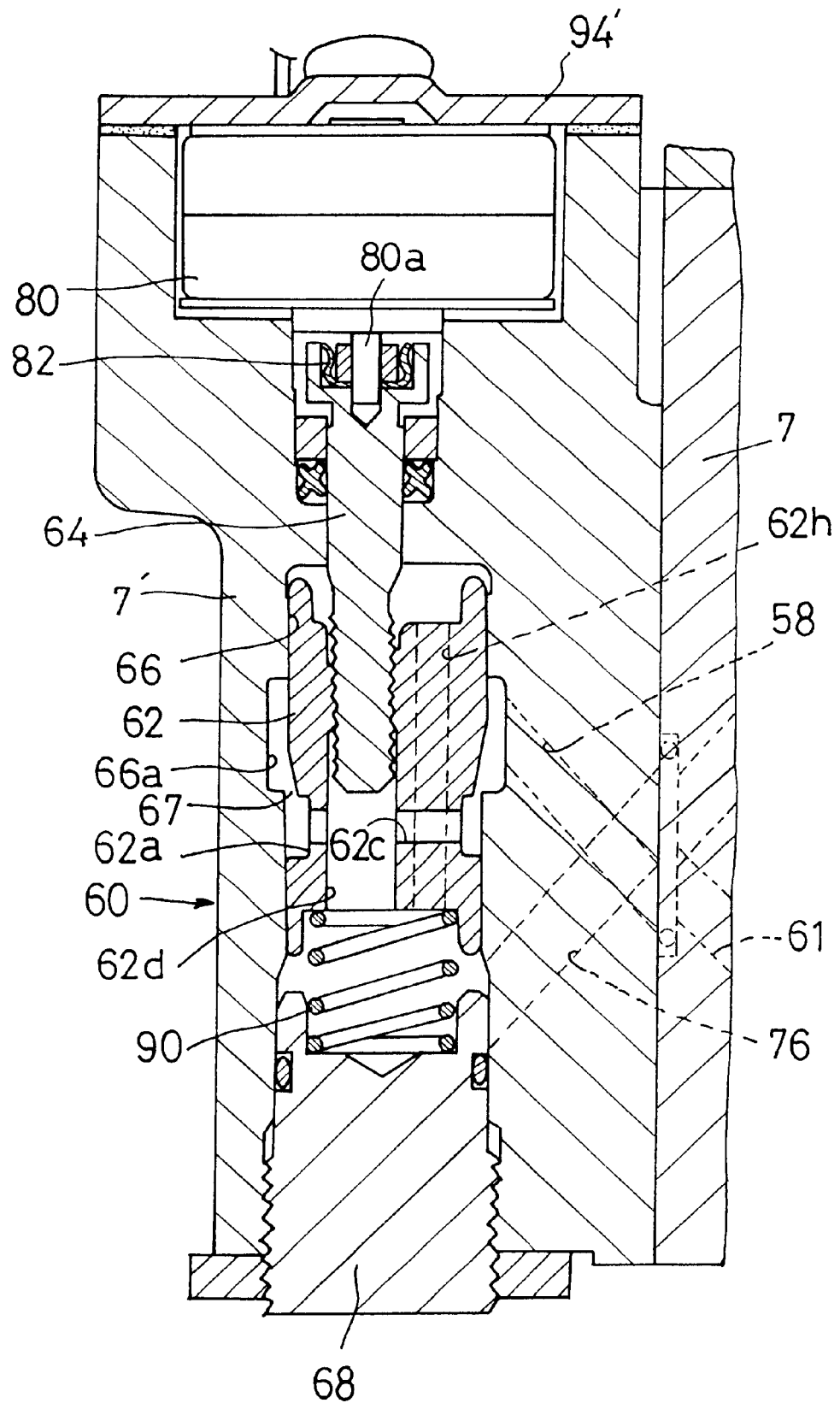
FIG. 6 is a vertical section of a variable-throttle valve in the embodiment of the present invention.

As diagrammed in FIG. 1 and FIG. 6, the variable-throttle valve 60 connected to the second outlet port 61 has a second valve housing 7' that is connected to the valve housing 7, a spool (moving member) 62 that is inserted in an insertion hole 66 formed in the second housing 7' so as to be capable of linear movement along its axial direction (the vertical direction in FIG. 1 and FIG. 6), a screw member 64 that screws into the spool 62, and a stepping motor 80 for driving a drive shaft 80a that is fitted into the screw member 64 so that turning of the drive shaft 80a can be transmitted to the screw member 64. The stepping motor 80 is driven to turn according to the number of pulses sent from a control device (not shown) constituted of a computer mounted in the vehicle.

The center axis of the screw member 64 is made parallel to the center axis of the spool 62, and these center axes are made eccentric to each other. Thus the spool 62 is prevented from turning together with the screw member 64, when the screw member 64 turns. Alternatively, the two center axes can be made to coincide to each other, in which case the spool 62 is prevented from turning together with the screw member 64, for example, by providing the second valve housing 7' with a projection, which fits in an axial-direction groove formed in the outer circumference of the spool 62 so as to be able to move relatively in the axial direction. In other words, it is sufficient that means for preventing the spool from turning together with the screw member is provided.

The control device connected to the stepping motor 80 is connected to a sensor (not shown) that detects vehicle speed as a vehicle driving condition, and sends pulses, whose number corresponds to the detected vehicle speed, to the stepping motor 80. Thus the motor 80 is driven to turn according to the number of steps corresponding to the vehicle speed. When the vehicle speed is high, the screw member 64 is turned in one direction and the spool 62 is moved upward in the figure. When the vehicle speed is lowered from the condition, the screw member 64 is turned in the other direction and the spool 62 is moved downward in the figure.

A circumferential groove 62a is formed in the outer circumference of the spool 62, a circumferential groove 66a is formed in the inner circumference of the insertion hole 66, and a variable-throttle portion 67 is made between the two circumferential grooves 62a and 66a. The degree of opening of this variable-throttle portion 67 varies according to the linear movement of the spool 62 in the axial direction. That is, the degree of opening becomes large when the vehicle speed is high and the spool 62 is moved upward in the figure, and becomes small when the vehicle speed is lowered and the spool 62 is moved downward.

A communicating flow path 58, through which the circumferential groove 66a in the inner circumference of the insertion hole 66 communicates with the second outlet port 61, is formed in the second valve housing 7'. A radial-direction hole 62c, through which a through hole 62d in the spool 62 communicates with the circumferential groove 62a in the outer circumference of the spool 62, is formed in the spool 62. The through hole 62d in the spool 62 communicates with the space in the insertion hole 66 below the spool 62. A communicating flow path 76, through which the space below the spool 62 communicates with the first outlet port 36, is formed so that it crosses over the valve housing 7 and the second valve housing 7' at the outside of the spool 62 in the radial direction of the spool 62. The part of communicating flow path 76, which is formed in the valve housing 7, constitutes a connecting port of the valve housing 7 to the variable-throttle valve 60 together with the second outlet port 61. A drain flow path 62h that is parallel to the through hole 62d is formed in the spool 62. The spaces above and below the spool 62 are connected to each other by the drain flow path 62h.

Figure 2:
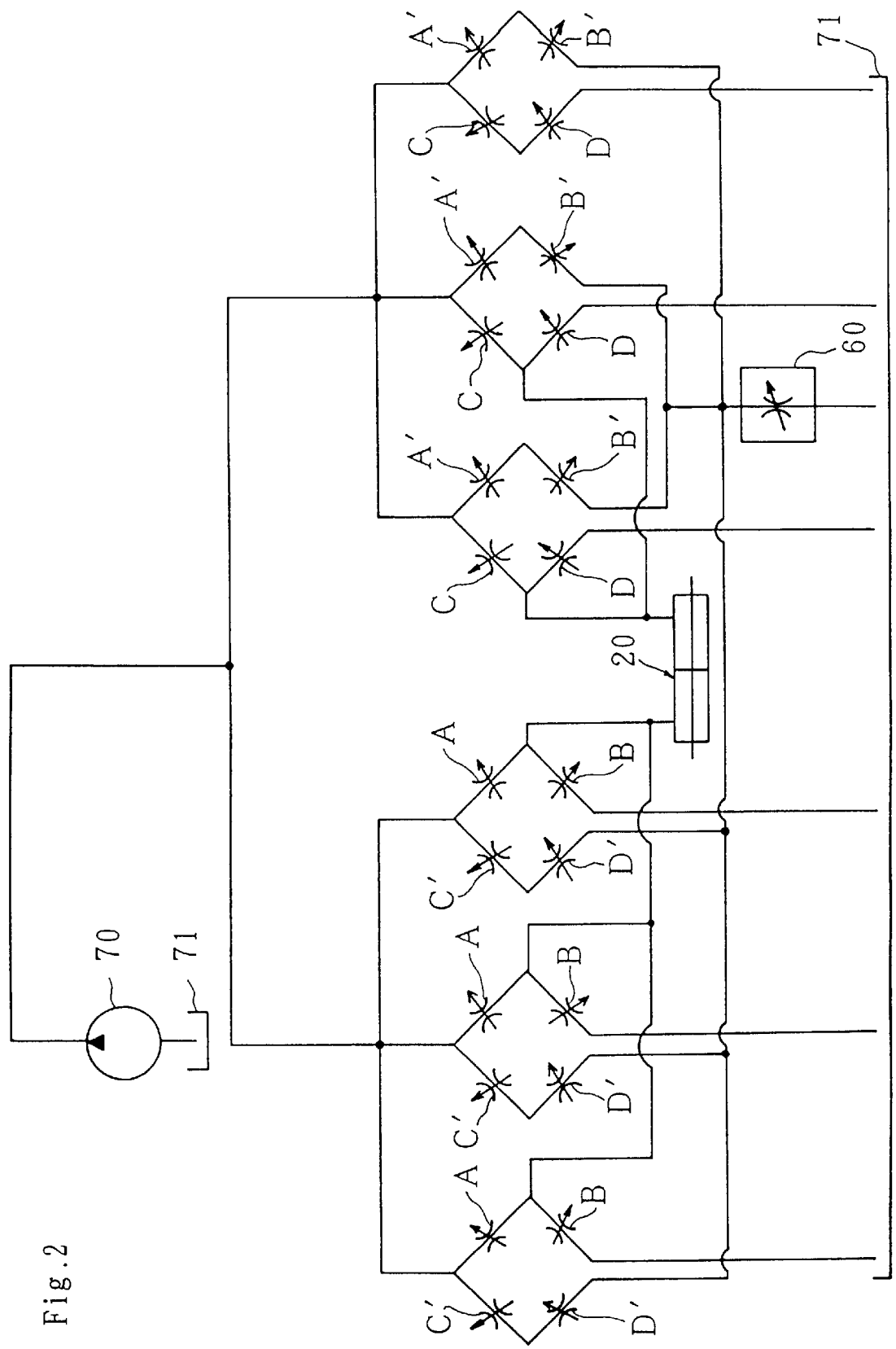
FIG. 2 is a diagram diagramming a hydraulic circuit in the hydraulic power steering device in the embodiment of the present invention.

Thus hydraulic fluid supplied from the pump 70 is led from the hydraulic fluid path 27 and the second outlet port 61 to the communicating flow path 58, and reaches the variable-throttle portion 67 from this communicating flow path 58, and from this variable-throttle portion 67 passes through the communicating flow path 76 and the first outlet port 36 to arrive at the tank 71. Accordingly, the hydraulic circuit diagrammed in FIG. 2 is constituted. That is, the throttle portions A, B, C, and D belonging to the first group and the throttle portions A', B', C', and D' belonging to the second group in the hydraulic control valve 30 are arranged mutually parallel. In the hydraulic fluid path between the tank 71 and the throttle portions A', B', C', and D' belonging to the second group, the variable-throttle portion 67 of the variable-throttle valve 60 is arranged. The variable-throttle valve 60 is connected in series with the throttle portions A', B', C', and D' belonging to the second group so that the ratio of the hydraulic fluid flow rate controlled by the throttle portions A, B, C, and D belonging to the first group to the hydraulic fluid flow rate controlled by the throttle portions A', B', C', and D' belonging to the second group can be varied.

One end of the insertion hole 66 is closed by a stopper 68 screwed into the second valve housing 7'. The other end of the insertion hole 66 is closed by a cover 94'. The linear movement of the spool 62 in one axial direction in order to make the degree of opening of the variable-throttle portion 67 smaller is stopped by the stopper 68. The amount, by which the stopper 68 is screwed into the second valve housing 7', is variable. Therefore, the position, at which the movement of the spool 62 is stopped by the stopper 68, is variable. A compressible coil spring 90 is arranged between the spool 62 and the stopper 68 to prevent the spool 62 from shaking.

Figure 7:
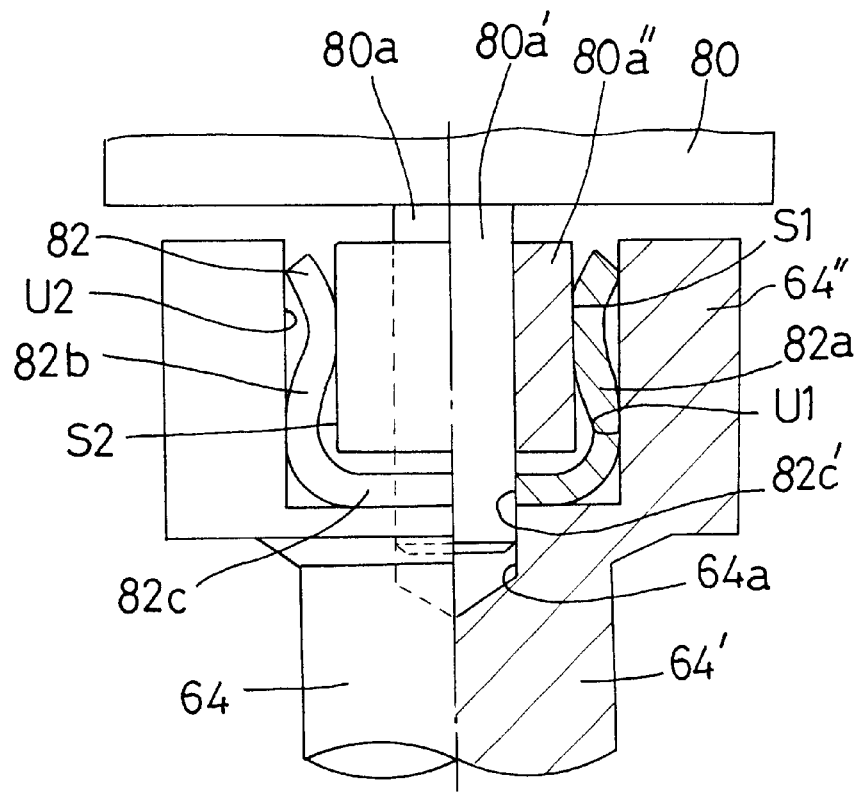
FIG. 7(1) is a half section of the main parts in the variable-throttle valve in the embodiment of the present invention, while FIG. 7(2) is a plane section of the main parts in the variable-throttle valve in the embodiment of the present invention.
Figure 7:
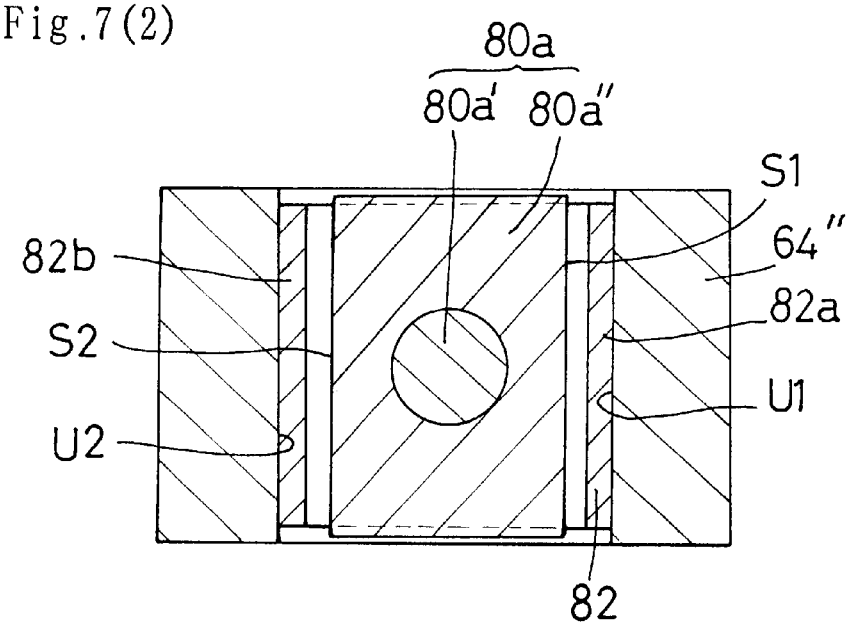

As diagrammed in FIGS. 7(1) and 7(2), the drive shaft 80a is fitted into the screw member 64 via an elastic member interposed therebetween so that turning of the drive shaft can be transmitted to the screw member. In this embodiment, that fitting is done by press fitting.

To be more precise, the drive shaft 80a has a cylindrical main body 80a' and an insertion portion 80a", whose cross-section perpendicular to its axis is non-circular. The main body 80a', in this embodiment, constitutes the output shaft of the stepping motor 80. The insertion portion 80a" is constituted of a rectangular parallelepiped block having a center hole. The main body 80a' is press-fitted into that center hole.

The screw member 64 has a cylindrical main body 64' and a receiving portion 64" that is made integral with the main body 64' at one end thereof. The cross-section of the receiving portion 64" perpendicular to its axis is non-circular. The screw member 64 screws into the spool 62 through a male screw portion formed in the other end side of the main body 64'. The receiving portion 64" extends in a double forked shape in the axial direction from one end of the main body 64'. Inner surfaces U1 and U2 of the receiving portion 64" are opposed to each other and arranged mutually parallel. The insertion portion 80a" is arranged between the two forks of the receiving portion 64". The inner surfaces U1 and U2 of the receiving portion 64" are faced to mutually parallel outer surfaces S1 and S2 of the insertion portion 80a" via intervals.

In this embodiment, the elastic member is constituted of a plate spring 82 having a pair of wavy plate portions 82a and 82b, and a connecting portion 82c connecting the two wavy plate portions 82a and 82b. The wavy plate portions 82a and 82b are elastically deformed by being sandwiched between the inner surfaces U1, U2 of the receiving portion 64" and the outer surfaces S1, S2 of the insertion portion 80a". The connecting portion 82c is arranged between the end surface of the main body 64' of the screw member 64 and the end surface of the insertion portion 80a". The tip of the main body 80a' of the drive shaft 80a is inserted in a hole 64a opened in the end surface of the main portion 64' of the screw member 64 with a clearance in the radial direction. For that reason, a hole 82c' is formed in the connecting portion 82c of the plate spring 81 for inserting the main body 80a' of the drive shaft 80a. The dimension of that clearance is made equal to or greater than the tolerance in concentric precision between the center axis of the drive shaft 80a and the center axis of the screw member 64.

In the constitution described in the foregoing, at initial vehicle engine startup, a certain number of pulses are sent to the motor 80 so that the motor 80 is driven to turn in one direction. By stopping the resulting movement of the spool 62 by means of the stopper 68, origin positioning is performed. That is, the motor 80 is driven to turn by a certain number of steps in one direction according to the certain number of pulses sent from the control device. The resulting position in which the movement of the spool 62 is stopped by the stopper 68 is taken as the origin. After this origin positioning, the spool 62 is positioned according to the turning steps of the motor 80 in the other direction. By the positioning of the spool 62, the degree of opening of the variable-throttle portion 67 is determined. The position at which the movement of the spool 62 is stopped by the stopper 68, that is to say the origin position, is variable. Accordingly, the degree of opening of the variable-throttle portion 67 can be adjusted to a desired value according to the turning steps of the motor 80.

When the origin positioning is performed for determining the degree of opening of the variable-throttle portion 67, the certain number of pulses are sent in order to turn the motor 80 in one direction. The certain number of pulses is set so that some pulses are sent to the motor 80 even after the origin positioning has been completed by stopping the movement of the spool 62 by means of the stopper 68. Thus the spool 62 can be positioned definitely at the origin. At this occasion, the motor 80 tries to turn due to the pulses that are sent to the motor 80 after the movement of the spool 62 has been stopped by the stopper 68. When that is happening, the occurrence of impact noises due to impact between the drive shaft 80a and the screw member 64 can be prevented, because the plate spring 82 is interposed between the screw member 64 and the drive shaft 80a driven by the motor 80. Thus the driver can be prevented from experiencing a sense of insecurity. The fitting of the drive shaft 80a into the screw member 64 via the plate spring 82 is to be done by press fitting. The error in concentric precision between the center axis of the drive shaft 80a and the center axis of the screw member 64 is absorbed by the elastic deformation of the plate spring 82.

The maximum value of the flow path area of the variable-throttle portion 67 is made equal to or greater than the maximum value of the flow path area of the throttle portions A', B', C', and D' belonging to the second group, or is increased until the throttling function ceases (The cited maximum value is in the context of the characteristic wherein the flow path area becomes smaller the larger the relative turning angle between the two valve members 31 and 32 becomes. That is, this is the maximum value of the total flow path area of the throttle portions B' and C' when steering to the right, and is the maximum value of the total flow path area of the throttle portions A' and D' when steering to the left. This applies hereinafter whenever the "maximum value of the flow path area" is mentioned.). The minimum value of the flow path area of the variable-throttle portion 67 is made equal to or less than the minimum value of the flow path area of the throttle portions A', B', C', and D' belonging to the second group (The cited minimum value is in the context of the characteristic wherein the flow path area becomes smaller the larger the relative turning angle between the two valve members 31 and 32 becomes. That is, this is the minimum value of the total flow path area of the throttle portions B' and C' when steering to the right, and is the minimum value of the total flow path area of the throttle portions A' and D' when steering to the left, inclusive of the completely closed condition. This applies hereafter whenever the "minimum value of the flow path area" is mentioned.).

Figure 8:
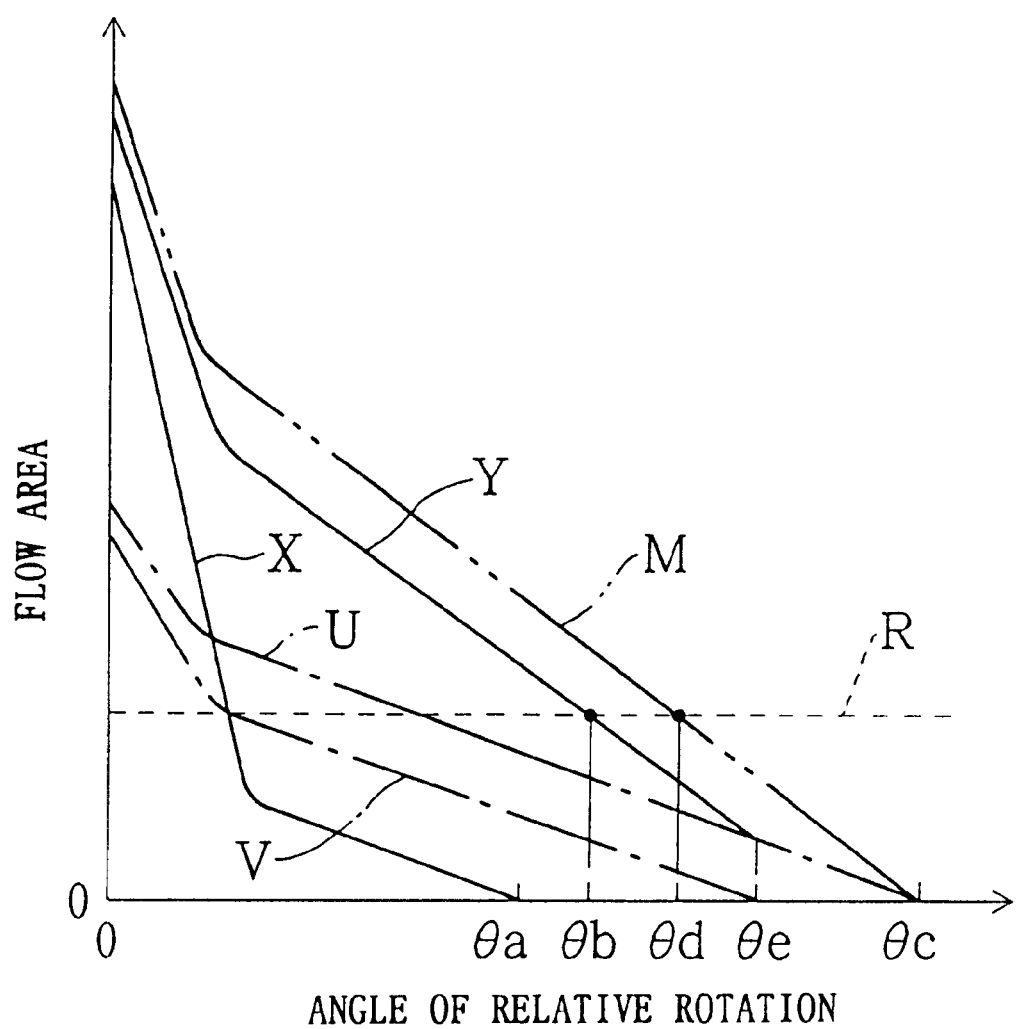
FIG. 8 is a graph that plots the relationship between the relative turning angle of a valve member and the degree of opening of throttle portions in the control valve in the hydraulic power steering device in the embodiment of the present invention.

In FIG. 8, the solid line curve X represents the flow path area variation characteristics of the throttle portions A, B, C, and D belonging to the first group relative to the relative turning angle between the two valve members 31 and 32 (The characteristics are such that the flow path area becomes smaller the larger the relative turning angle becomes. This refers, in this case, to the variation characteristics in the total flow path area of the throttle portions B and C when steering to the right, and to the variation characteristics in the total flow path area of the throttle portions A and D when steering to the left. This applies hereinafter whenever "flow path area variation characteristics" are mentioned.). The single-dotted line curve U represents the flow path area variation characteristics of the throttle portions A' and C' between the hydraulic fluid supply grooves 51a and the communicating grooves 50c belonging to the second group relative to the relative turning angle. The single-dotted line curve V represents the flow path area variation characteristics of the throttle portions B' and D' between the communicating grooves 50c and the second hydraulic fluid discharge grooves 51c belonging to the second group relative to the relative turning angle. The solid line curve Y represents the characteristics that result when the flow path area variation characteristics of the throttle portions A' and C' and the flow path area variation characteristics of the throttle portions B' and D' are combined. The broken line curve R represents the flow path area of the variable-throttle portion 67 at a medium vehicle speed.

Figure 9:
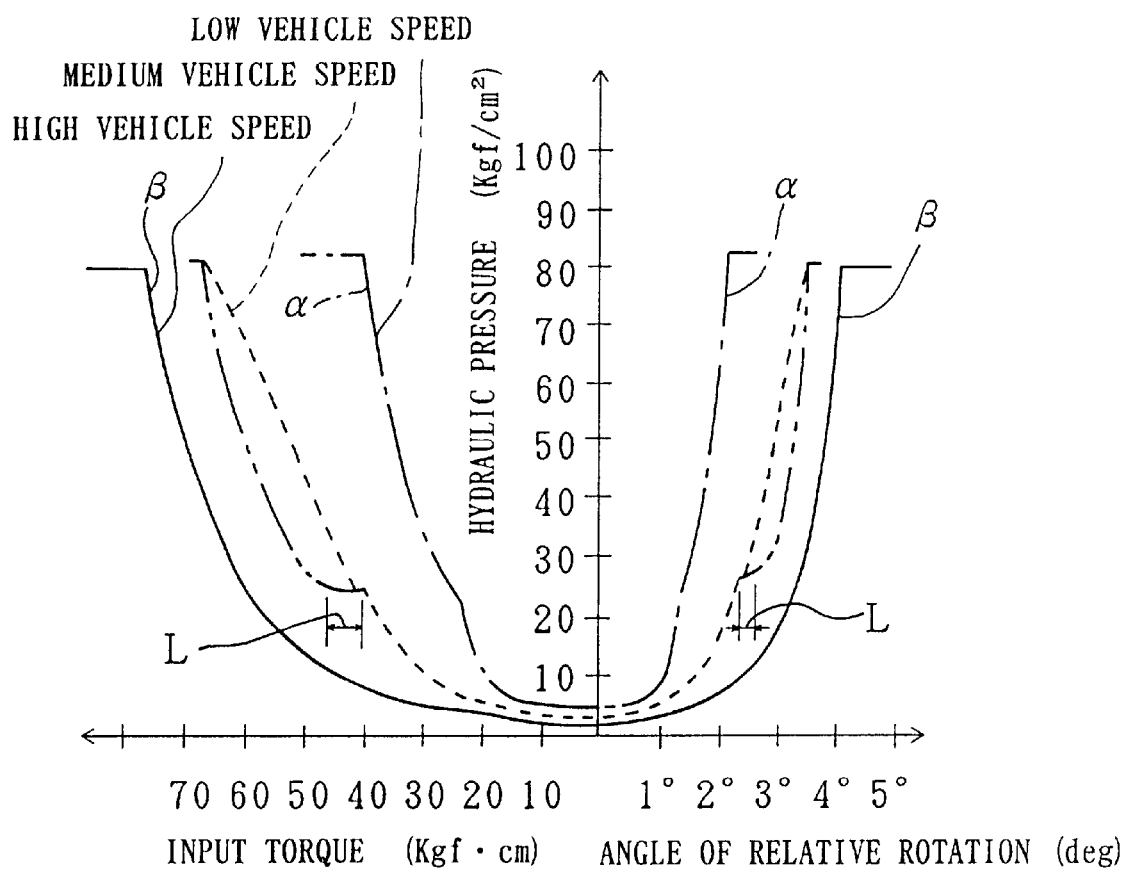
FIG. 9 is a graph plotting both the relationship between input torque and hydraulic pressure and the relationship between hydraulic pressure and the relative turning angle of two valve members in the hydraulic power steering device in the embodiment of the present invention.

At low vehicle speed, the spool 62 is displaced downward in FIG. 1 and FIG. 6, and the variable-throttle portion 67 becomes completely closed as a result of this displacement of the spool 62. Accordingly, the hydraulic fluid acting on the hydraulic cylinder 20 is controlled according to the flow path area variation characteristic curve X of the throttle portions A, B, C, and D of the first group. In this case, as indicated by the single-dotted line curve α in FIG. 9, the degree of opening of the throttle portions A, B, C, and D belonging to the first group is small, even though the steering input torque corresponding to the steering resistance is small, and even though the relative turning angle between the two valve members 31 and 32 is small. Accordingly, the non-sensible region, where the hydraulic pressure hardly changes at all with changes in the steering input torque, can be made small, and therefore highly responsive steering can be satisfied, and turning performance can be improved.

At high vehicle speeds, the spool 62 is displaced upward in FIG. 1 and FIG. 6, and due to this displacement of the spool 62, the flow path area of the variable-throttle portion 67 becomes equal to or greater than the maximum value of the flow path area of the throttle portions A', B', C', and D' belonging to the second group. Accordingly, the hydraulic pressure acting on the hydraulic cylinder 20 is controlled according to the combined characteristics of the variation characteristic curve Y for the flow path area of the throttle portions A', B', C' and D' in the second group and the variation characteristic curve X for the flow path area of the throttle portions A, B, C, and D in the first group. In this case, as indicated by the solid line curve β in FIG. 9, the degree of opening of the throttle portions A', B', C', and D' belonging to the second group is large even though the steering input torque is large, and even though the relative turning angle between the two valve members 31 and 32 is large. Accordingly, the non-sensible region is large, and the steering stability at high vehicle speeds can be satisfied.

At medium vehicle speeds, the flow path area of the variable-throttle portion 67 resulting from the displacement of the spool 62 is larger than the minimum value of the flow path area of the throttle portions A', B', C', and D' belonging to the second group but smaller than the maximum value thereof. As a consequence, as diagrammed in FIG. 8, until the value of the flow path area of the throttle portions A, B, C, and D belonging to the first group becomes the minimum value (the completely closed condition in this embodiment) (that is, until the relative turning angle between the two valve members becomes θa in FIG. 8), a steering assistance power is applied so that it corresponds to the characteristics resulting from the combining of the flow path area variation characteristic curve X for the throttle portions A, B, C, and D belonging to the first group and the flow path area characteristic curve R for the variable-throttle portion 67. From the time when the throttle portions A, B, C, and D belonging to the first group become completely open, until the flow path area of the throttle portions A', B', C', and D' belonging to the second group becomes smaller than the flow path area of the variable-throttle portion 67 (that is, the interval between the relative turning angles θa and θb between the two valve members in FIG. 8), the steering assistance power is a constant value determined by the flow path area of the variable-throttle portion 67. Subsequent thereto, when the flow path area of the throttle portions A', B', C', and D' belonging to the second group becomes smaller than the flow path area of the variable-throttle portion 67, a steering assistance power corresponding to the flow path area variation characteristic curve Y for the throttle portions A', B', C', and D' belonging to the second group is applied.

After the throttle portions A, B, C, and D belonging to the first group have become completely closed, the interval until the flow path area of the throttle portions A', B', C', and D' belonging to the second group becomes smaller than the flow path area of the variable-throttle portion 67 (the interval from θa to θb) is made small, without making the difference (θc−θa) between the point where the throttle portions A', B', C', and D' belonging to the second group become completely closed and the point where the throttle portions A, B, C, and D belonging to the first group become completely closed small. That is, if it is assumed that the throttle portions B' and D' exhibit the flow path area variation characteristics relative to the relative turning angle represented by the single-dotted line curve U in FIG. 8 as the throttle portions A' and C', then the flow path area variation characteristics for the throttle portions A', B', C', and D' belonging to the to the second group relative to the relative turning angle is represented by the double-dotted line curve M in FIG. 8. Thereupon, the interval until the flow path area of the throttle portions A', B', C', and D' belonging to the second group becomes smaller than the flow path area of the variable-throttle portion 67 (the interval between the relative turning angles θa and θd in the two valve members) becomes larger. Accordingly, as is indicated by the double-dotted line curve in FIG. 9, the region L where the steering assistance force cannot be controlled in response to the steering resistance becomes larger. To the contrary, in the above embodiment, the closing angle θs of the throttle portions B' and D' is smaller than the closing angle θr of the throttle portions A' and C', and therefore the region where the steering assistance force cannot be controlled in response to the steering resistance can be made smaller at medium vehicle speeds. Not only so, but, at the point where the throttle portions B' and D' become completely closed (the point where the relative turning angle between the two valve members is θe in FIG. 8), the throttle portions A' and C' are not yet closed, and therefore the region where the steering assistance force can be controlled in response to the steering resistance does not become smaller.

Figure 10:
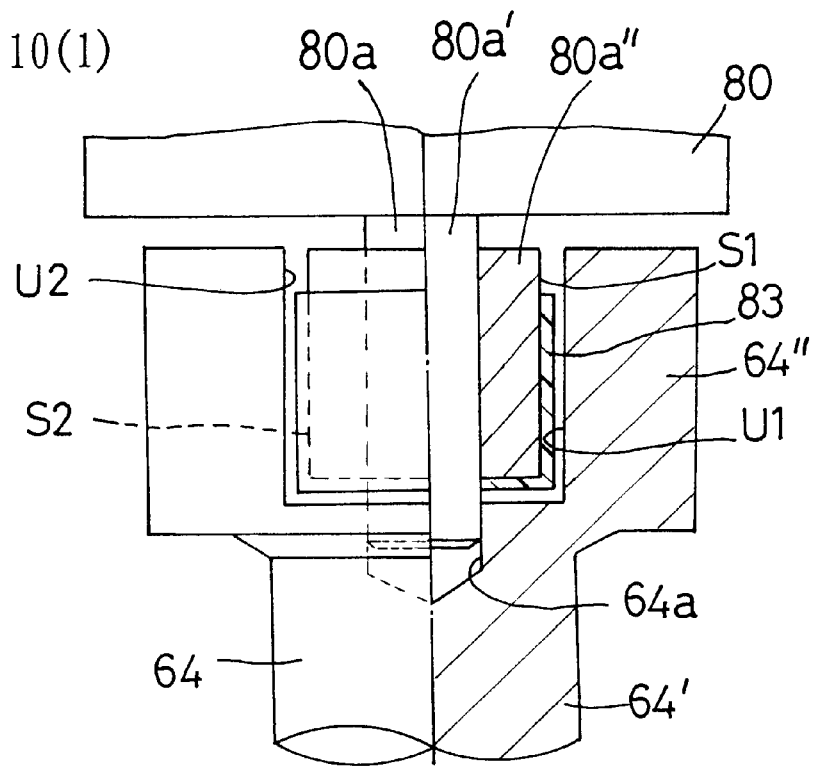
FIG. 10(1) is a half section of the main parts in a variable-throttle valve in the first modification example of the embodiment of the present invention, FIG. 10(2) is a plane section of the main parts in the variable-throttle valve in the first modification example of the embodiment of the present invention.
Figure 10:
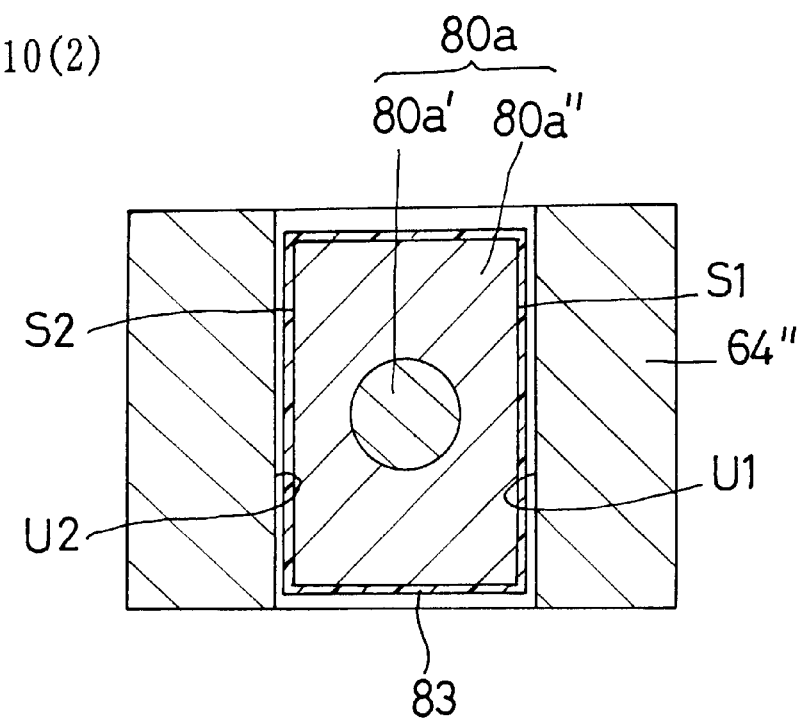

In FIGS. 10(1) and 10(2) is diagrammed a first modification example of the embodiment described in the foregoing. What is different from the embodiment described in the foregoing is that a synthetic resin coating material 83 exhibiting elasticity is used as the elastic member instead of the plate spring 82. The insertion portion 80a" is coated with the coating material 83. The fitting of the drive shaft 80a into the screw member 64 via the coating material 83 is done with an intervening gap. Ethylene polytetrafluoride (PTFE), for example, is used for the coating material 83. The coating thickness is preferably 100 μm or greater. The coating is performed by dip coating, for example. The receiving portion 64" can also be coated with a synthetic resin exhibiting elasticity as well as the insertion portion 80a" or instead of the insertion portion 80a". Otherwise this modification example is the same as the embodiment described earlier, and identical parts are indicated by identical symbols.

Figure 11:
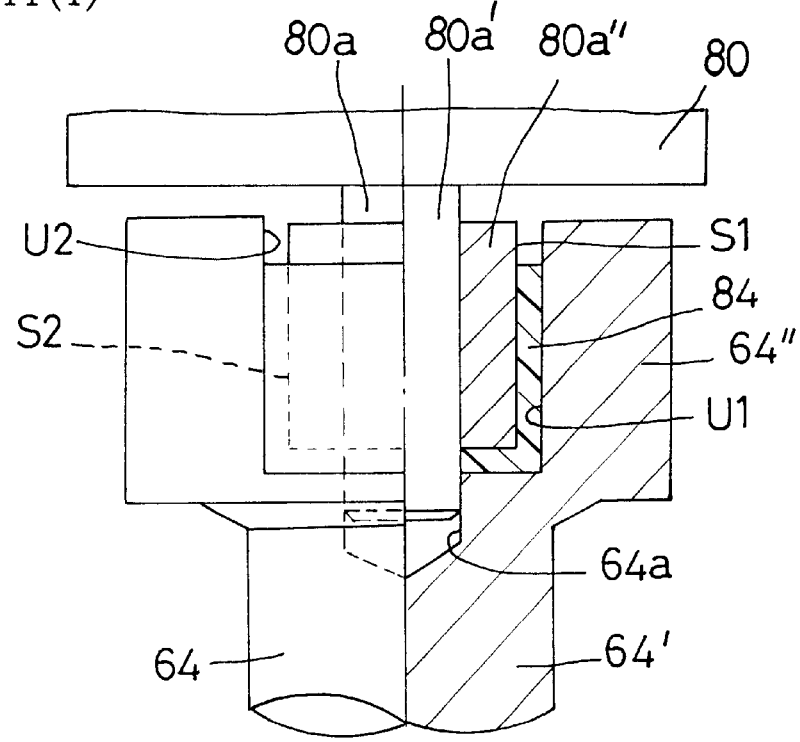
FIG. 11(1) is a half section of the main parts in a variable-throttle valve in a second modification example of the embodiment of the present invention, FIG. 11(2) is a plane section of the main parts in the variable-throttle valve in the second modification example of the embodiment of the present invention.
Figure 11:
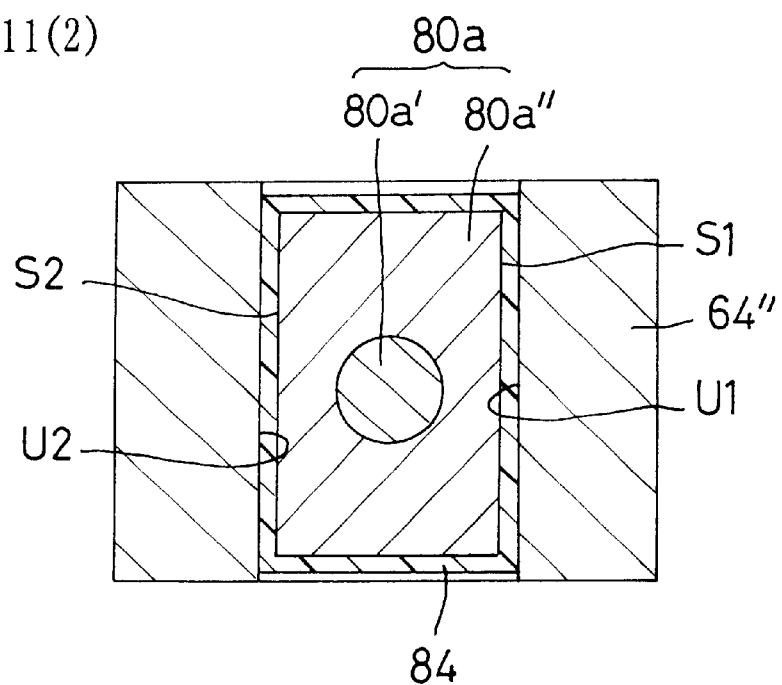

In FIGS. 11(1) and 11(2) is diagrammed a second modification example of the embodiment described in the foregoing. What is different from the embodiment described in the foregoing is that an anti-vibration sheet 84 made of a synthetic resin exhibiting elasticity, which is fitted to the insertion portion 80a", is used as the elastic member instead of the plate spring 82. The fitting of the drive shaft 80a into the screw member 64 via the anti-vibration sheet 84 can be done by press fitting or interposing a gap. The anti-vibration sheet 84 covers the outer circumference and end surface of the insertion portion 80a". The material for the anti-vibration sheet 84 is made of PTFE, for example. The thickness of the anti-vibration sheet 84 is made on the order of 0.2 mm, for example. Otherwise this modification example is the same as the embodiment described earlier, and identical parts are indicated by identical symbols.

Figure 12:
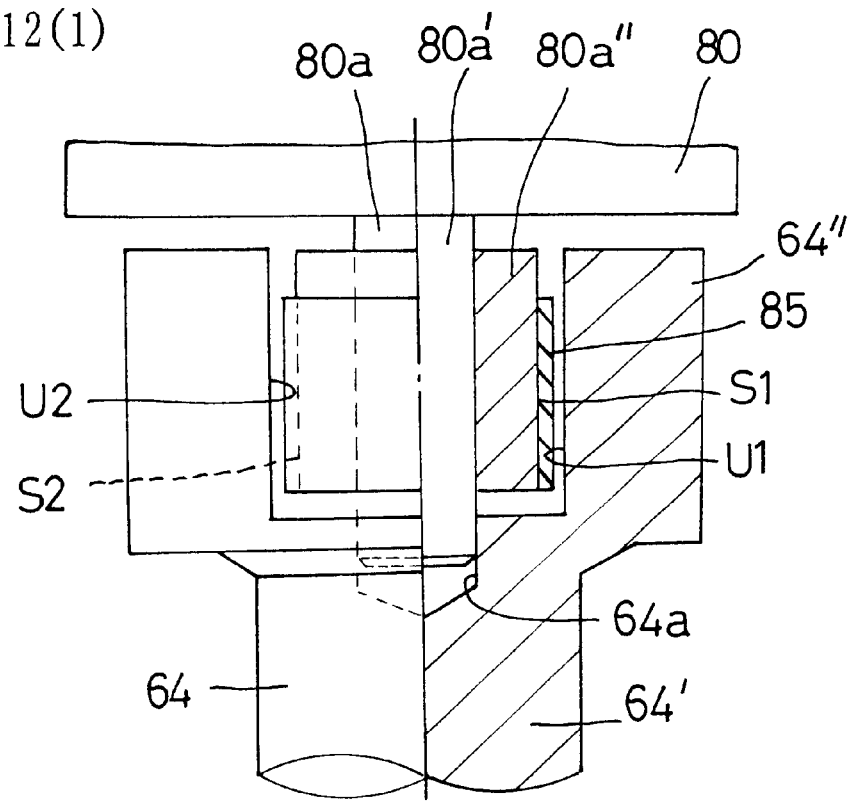
FIG. 12(1) is a half section of the main parts in a variable-throttle valve in a third modification example of the embodiment of the present invention, FIG. 12(2) is a plane section of the main parts in the variable-throttle valve in the third modification example of the embodiment of the present invention.
Figure 12:
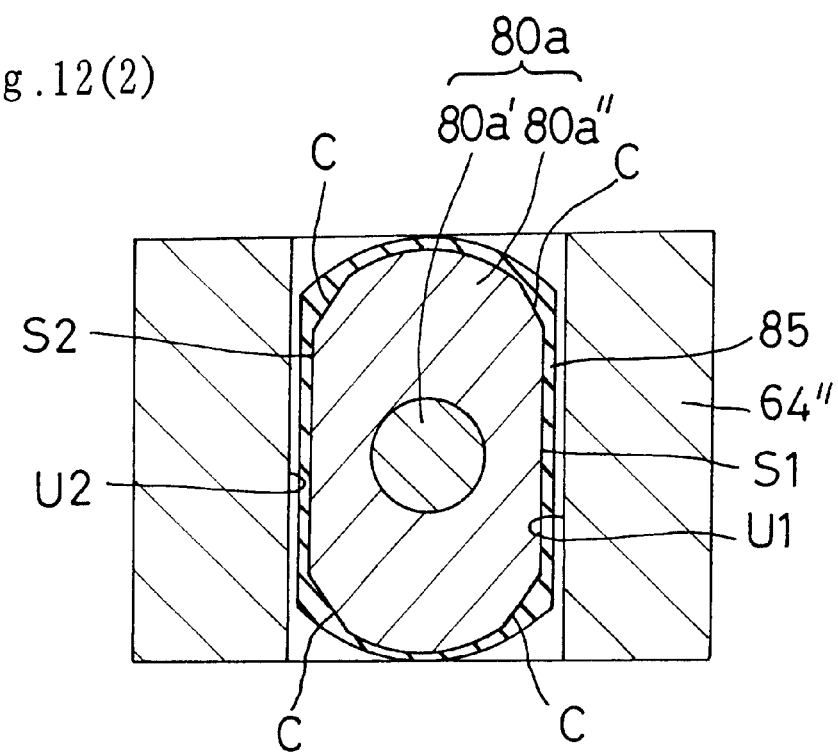

In FIGS. 12(1) and 12(2) is diagrammed a third modification example of the embodiment described in the foregoing. What is different from that embodiment is that a rubber coating material 85 exhibiting elasticity is used as the elastic member instead of the plate spring 82. The insertion portion 80a" is coated with the rubber coating material 85. The fitting of the drive shaft 80a into the screw member 64 via the coating material 85 is done by interposing a gap. The coating thickness of the coating material 85 is preferably 100 μm or greater. The coating is performed by baking, for example. The edges extending in the axial direction in the insertion portion 80a" are made chamfered areas C, and wear is countered by making the coating thickness of the coating material 85 greater in the areas along those edges. The receiving portion 64" can be coated with the rubber coating material 85 together with the insertion portion 80a" or instead of the insertion portion 80a". The fitting of the drive shaft 80a into the screw member 64 via the rubber coating material 85 may be done by press fitting. The rubber coating material 85 may only cover the areas on the outer surface of the insertion portion 80a", which come to contact with the inner surfaces U1 and U2 of the receiving portion 12. Otherwise this modification example is the same as the embodiment described earlier, and identical parts are indicated by identical symbols.

Figure 13:
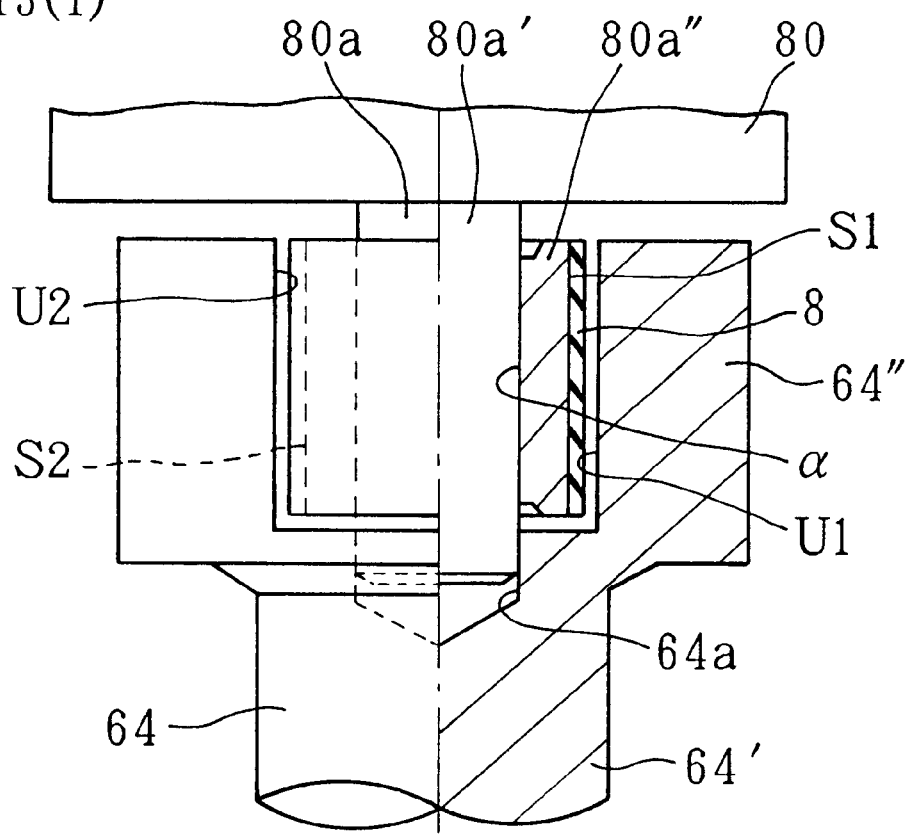
FIG. 13(1) is a half section of the main parts in a variable-throttle valve in a fourth modification example of the embodiment of the present invention, FIG. 13(2) is a plane section of the main parts in the variable-throttle valve in the fourth modification example of the embodiment of the present invention.
Figure 13:
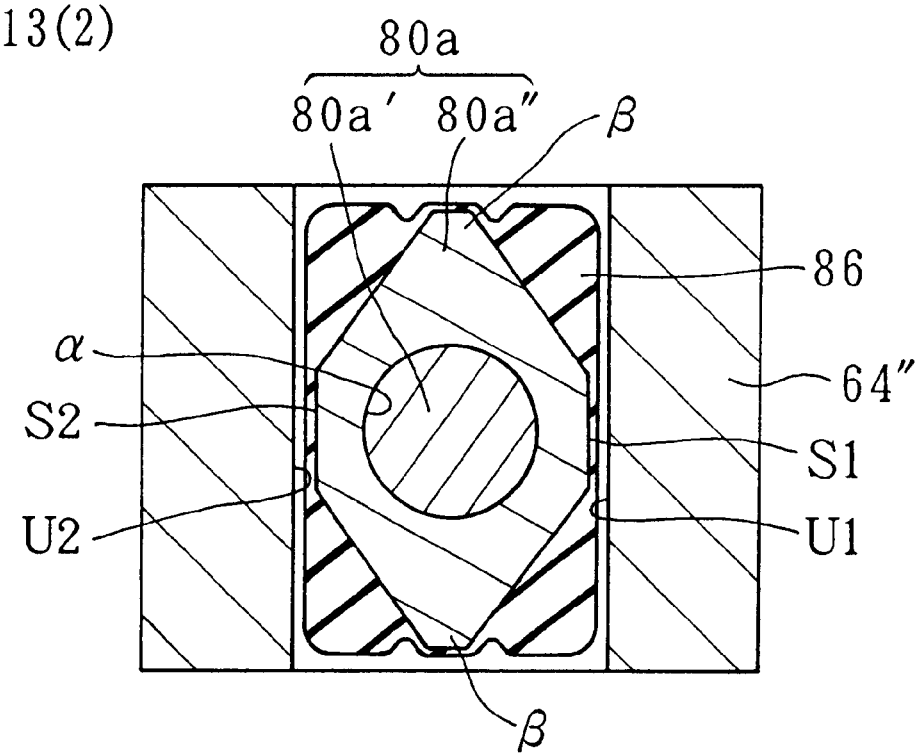
Figure 14:
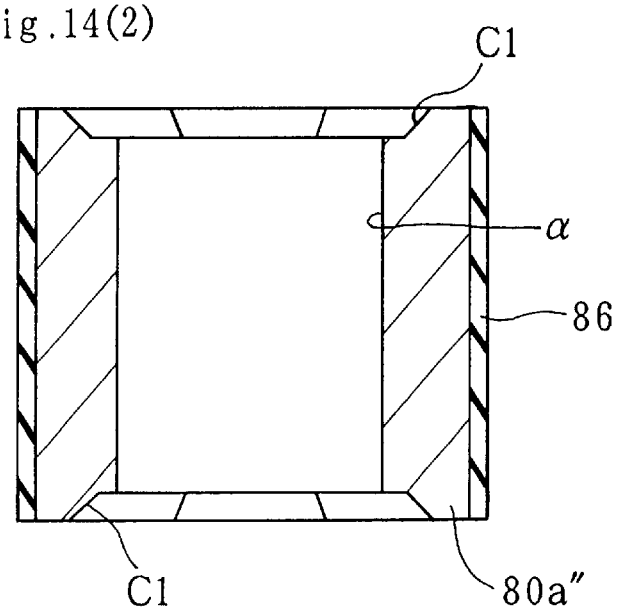
FIG. 14(1) is a front elevation of an insertion portion and coating material in the variable-throttle valve in the fourth modification example of the embodiment of the present invention.
Figure 14:
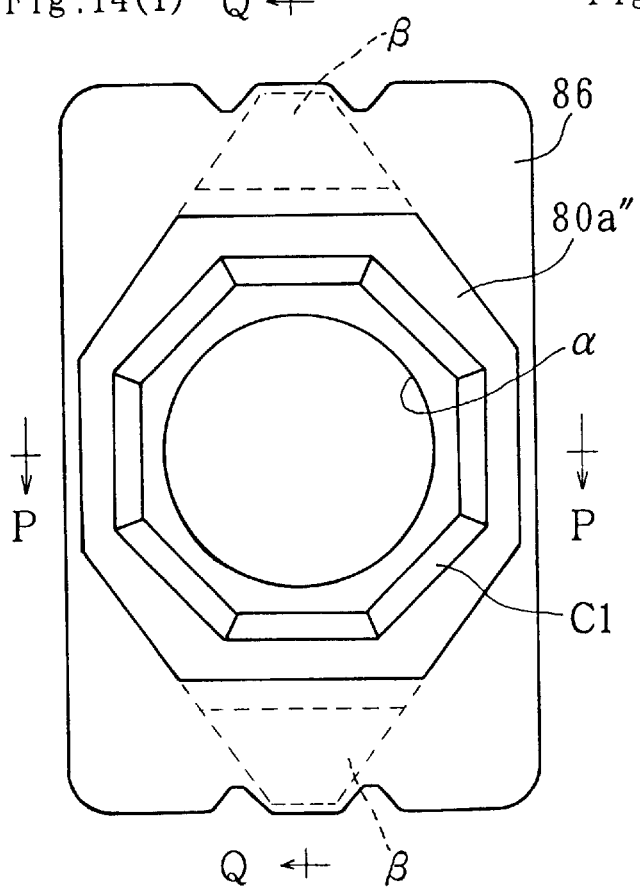
Figure 14:
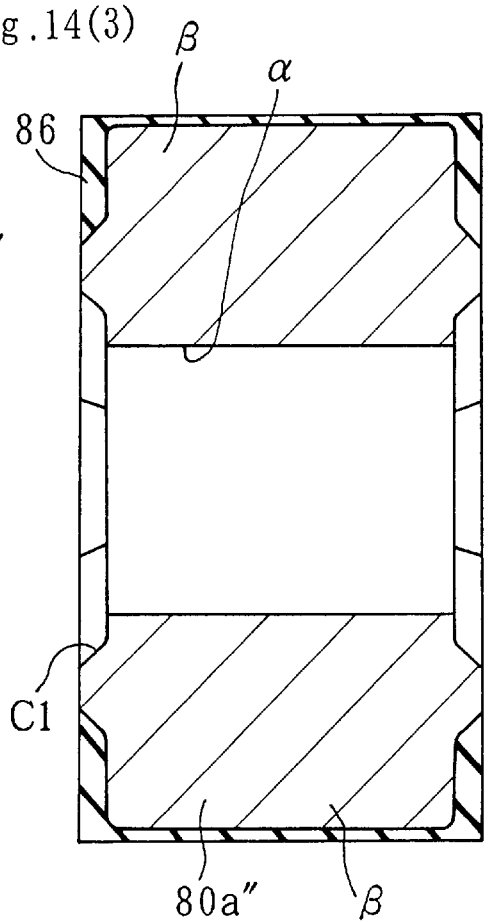

In FIGS. 13(1), 13(2), 14(1), 14(2), and 14(3) is diagrammed a fourth modification example of the embodiment described earlier. What is different from the embodiment described earlier is that a rubber coating material 86 exhibiting elasticity is used as the elastic member instead of the plate spring 82. The metal insertion portion 80a" is coated with the rubber coating material 86. The fitting of the drive shaft 80a into the screw member 64 via the coating material 86 is done by interposing a gap. The coating thickness of the coating material 86 is preferably 100 μm or greater. The coating is done by baking, for example. The center hole a in the insertion portion 80a" is made so that the diameter thereof is larger at both ends than at the middle. The aperture edge of the center hole a at each end thereof is formed into a chamfer C1 that is of an octagonal shape as seen from the front. The outer circumference of the insertion portion 80a" is given an octagonal shape at both ends as seen from the front. Between both ends of the outer circumference of the insertion portion 80a", projections β are formed so as to extend outward from two of the sides of the octagon that oppose to each other. The coating material 86 is made so that the outer circumference of the cross-section perpendicular to the axis of the drive shaft 80a is made rectangular. Thereby, the thickness of the coating material 86 is made greater in the areas which is contact with the inner surfaces U1 and U2 of the receiving portion 64" in order to counter wear. The fitting of the drive shaft 80a into the screw member 64 via the rubber coating material 86 may be made by press fitting. The rubber coating material 86 may only cover the areas on the outer surface of the insertion portion 80a", which come to contact with the inner surfaces U1 and U2 of the receiving portion 64". Otherwise this modification example is the same as the embodiment described earlier, and identical parts are indicated by identical symbols.

The present invention is not limited to the embodiment or modification examples described in the foregoing. Pulses, whose number corresponds to a vehicle driving condition other than vehicle speed, such as steering angle, can be sent from the control device to the stepping motor, for example. The drive shaft is not limited to one that constitutes the output shaft of the stepping motor, and can be one that is driven to turn by the stepping motor through a gear mechanism, for example. Also, a variable-throttle valve comprising the positioning mechanism of the present invention can be used in a hydraulic circuit other than a hydraulic power steering system. Furthermore, the positioning mechanism of the present invention can be used for positioning a moving member other than the spool of a variable-throttle valve.

What is claimed is:

1. A positioning mechanism comprising:
   a moving member capable of linear movement;
   a screw member that screws into the moving member;
   a drive shaft fitted into the screw member so that turning of the drive shaft can be transmitted to the screw member;

a stepping motor for driving the drive shaft to turn;

means for preventing the moving member from turning together with the screw member when the screw member is turning; and a stopper capable of stopping the linear movement of the moving member in one direction caused by the turning of the screw member;

wherein origin positioning is performed by stopping, by means of the stopper, the linear movement of the moving member caused by driving the motor to turn in one direction, and the moving member is positioned according to turning steps of the motor in the other direction after the origin positioning; and the drive shaft is fitted into the screw member to absorb rotational shocks caused by said stepper motor being further actuated to effect further movement despite the mechanical stopping of the moving member to ensure origin positioning via an elastic member interposed therebetween so that turning of the drive shaft can be transmitted to the screw member.

2. The positioning mechanism according to claim 1, wherein the moving member constitutes a spool that is inserted into a housing of a variable-throttle valve; a variable-throttle portion, degree of opening of which varies according to the linear movement of the spool along its axial direction, is provided; and the degree of opening of the variable-throttle portion is determined by positioning of the spool according to turning steps of the motor in the other direction after the origin positioning.

3. A positioning mechanism in a hydraulic power steering device, comprising a hydraulic control valve having a plurality of throttle portions, degrees of opening of which vary according to steering resistance; wherein hydraulic pressure acting on a steering assistance power generating hydraulic actuator is changed according to changes in the degrees of opening of the throttle portions; the plurality of throttle portions in the hydraulic control valve are divided between those belonging to a first group and those belonging to a second group that are arranged mutually parallel; steering resistance required to close the throttle portions belonging to the second group is made larger than steering resistance required to close the throttle portions belonging to the first group; the variable-throttle valve cited in claim 2 is connected in series with the throttle portions belonging to the second group so that ratio of hydraulic fluid flow rate controlled by the throttle portions belonging to the first group to hydraulic fluid flow rate controlled by the throttle portions belonging to the second group can be varied; and pulses, whose number corresponds to vehicle driving conditions, are sent from the control device to the motor.

4. The positioning mechanism according to any one of claims 1 to 3 wherein:

the drive shaft is constituted of a cylindrical main body and a metal insertion portion, whose cross-section perpendicular to its axis is non-circular and has a the main body is press-fitted in the center hole of the insertion portion;

the screw member has a receiving portion that extends in a double forked shape in its axial direction;

the insertion portion is arranged between two opposing inner surfaces of the receiving portion; and a rubber coating material is provided as the elastic member, so as to cover at least the areas on the outer surface of the insertion portion, which come to contact with the inner surfaces of the receiving portion.

5. A positioning mechanism for effecting linear movement:

a movable member movably supported for linear movement in a support structure along a path to an stop end at which movement is mechanically stopped;

a rotatable member threadably engaging said movable member such that rotation of said rotatable member effect linear movement of said movable member, said rotatable member having an first engagement portion distal from said movable member;

a rotation arresting structure for stopping rotation of said movable member in conjunction with rotation of said rotatable member;

a stepper motor having a drive shaft which has a second engagement portion engaging said first engagement portion of said rotatable member to permit rotation of said rotatable member by said stepper motor so that said movable member is moved along said path to said stop end whereat said stepper motor is further actuated to effect further movement despite the mechanical stopping of the movable member to ensure origin positioning; and an elastic member interposed between said first and second engagement portions to absorb rotational shocks caused by said stepper motor being further actuated to effect further movement despite the mechanical stopping of the movable member to ensure origin positioning.

6. A positioning mechanism for effecting linear movement according to claim 5 wherein:

said first and second engagement portions have opposing engagement surfaces extending in an axial direction of said drive shaft for transmitting rotational force; and said elastic member includes a spring member having a wave configuration disposed between said opposing engagement surfaces to effect elastic interaction therebetween by elastic flattening of the wave configuration, said wave configuration having crests and valleys extending in a wave front direction which is orthogonal with respect to said axial direction of said drive shaft, and said wave configuration flaring outward from an axis of said drive shaft at an edge thereof for reception of one of said first and second engagement portions.

7. A positioning mechanism for effecting linear movement according to claim 5 wherein:

said first and second engagement portions have opposing engagement surfaces extending in an axial direction of said drive shaft for transmitting rotational force; and said elastic member includes an elastic resin disposed between said opposing engagement surfaces to effect elastic interaction therebetween by elastic compression.

8. A positioning mechanism for effecting linear movement according to claim 7 wherein said elastic resin is adhered to one of said first and second engagement portions as a coating.

9. A positioning mechanism for effecting linear movement according to claim 7 wherein said elastic resin being is an elastic sheet material disposed between said first and second engagement portions.

10. A positioning mechanism for effecting linear movement according to claim 7 wherein said opposing surfaces define a widening gap therebetween which widens with greater distance from an axis of said drive shaft and said elastic resin fills said widening gap and thereby increases in thickness corresponding to a width of said widening gap with greater distance from said axis of said drive shaft.

11. A positioning mechanism for effecting linear movement according to claim 10 wherein one of said first and second engagement portions provides parallel surfaces of said opposing surfaces defining a channel and another one of said first and second engagement portions provides a block disposed between said parallel surfaces in said channel and said block has chamfered corners defining said widening gap.

12. A positioning mechanism for effecting linear movement according to claim 10 wherein one of said first and second engagement portions provides parallel surfaces of said opposing surfaces defining a channel and another one of said first and second engagement portions provides an octagon block disposed between said parallel surfaces in said channel and said octagon block having four sides defining said widening gap.

13. A hydraulic power steering device, comprising:

a throttle valve incorporating said positioning device of any one of claims 5–12 wherein said movable member is a spool which is moved to adjust flow rate through said throttle valve;

a hydraulic control valve having a plurality of throttle portions, degrees of opening of which vary according to steering resistance; and a steering assistance power generating hydraulic actuator connected to said throttle valve and said hydraulic control valve where hydraulic pressure is changed according to changes in the degrees of opening of the throttle portions and a positioning of said spool in said throttle valve.

* * * * *